(12) United States Patent
Shapland et al.

(10) Patent No.: US 9,714,874 B2
(45) Date of Patent: Jul. 25, 2017

(54) DETERMINING SENSIBLE HEAT FLUX WITHOUT CALIBRATION

(71) Applicant: The Regents of the University of California, Oakland, CA (US)

(72) Inventors: Thomas Michael Shapland, Davis, CA (US); Kyaw Tha Paw U, Davis, CA (US); Richard Snyder, Davis, CA (US); Andrew McElrone, Davis, CA (US)

(73) Assignees: The United States of America, as represented by the Secretary of Agriculture, Washington, DC (US); The Regents of the University of California, Oakland, CA (US)

( * ) Notice: Subject to any disclaimer, the term of this patent is extended or adjusted under 35 U.S.C. 154(b) by 623 days.

(21) Appl. No.: 14/286,882

(22) Filed: May 23, 2014

(65) Prior Publication Data
US 2014/0348201 A1    Nov. 27, 2014

Related U.S. Application Data

(60) Provisional application No. 61/827,306, filed on May 24, 2013, provisional application No. 61/828,605, filed on May 29, 2013, provisional application No. 61/894,505, filed on Oct. 23, 2013.

(51) Int. Cl.
*G01K 17/00*    (2006.01)
*G01K 15/00*    (2006.01)
*G01J 5/00*     (2006.01)
*G01K 17/20*    (2006.01)

(52) U.S. Cl.
CPC .................................. *G01K 17/20* (2013.01)

(58) Field of Classification Search
USPC .............................................. 374/29, 1, 121
See application file for complete search history.

(56) References Cited

U.S. PATENT DOCUMENTS 5,772,329 A * 6/1998 Bardon .................. G01K 17/20
                                                    374/166

* cited by examiner

*Primary Examiner* — Mirellys Jagan
(74) *Attorney, Agent, or Firm* — Park, Vaughan, Fleming & Dowler LLP

(57) ABSTRACT

By correcting temperature measurements above a surface (such as the ground) for the first-order filtering associated with the thermal inertia of a temperature sensor (such as a thermocouple) that performed the temperature measurements, the heat flux conveyed from the surface by air can be accurately determined without requiring a calibration procedure. Instead, a predefined calibration value may be used. This predefined calibration value may be a function of a size of the temperature sensor and/or a distance between the temperature sensor and the ground. Moreover, the predefined calibration value may have a fixed value for a given size of the temperature sensor. In addition, the measurement of the heat flux conveyed from the surface can be used to accurately determine the residual heat flux that vaporizes water from the surface without a calibration procedure.

20 Claims, 5 Drawing Sheets

DETERMINING SENSIBLE HEAT FLUX WITHOUT CALIBRATION

CROSS-REFERENCE TO RELATED APPLICATIONS

This application claims priority under 35 U.S.C. §119(e) to U.S. Provisional Application Ser. No. 61/827,306, entitled "A Turnkey Data Logger Program for Field Energy Flux Density Measurements Using Eddy Covariance and Surface Renewal," by Thomas Shapland, Kyaw Tha Paw U, Richard Snyder and Andrew McElrone, filed on May 24, 2013, and to U.S. Provisional Application Ser. No. 61/828,605, entitled "Calibration of the Surface Renewal Technique for Sensible Heat Flux Density and Evapotranspiration Measurements," by Thomas Shapland, Kyaw Tha Paw U, Richard Snyder and Andrew McElrone, filed on May 29, 2013, and to U.S. Provisional Application Ser. No. 61/894,505, entitled "Radiometer, Temperature Sensor and Software System for Processing Surface Renewal Data," by Thomas Shapland, Kyaw Tha Paw U, Richard Snyder and Andrew McElrone, filed on Oct. 23, 2013, the contents of all of which are herein incorporated by reference.

GOVERNMENT LICENSE RIGHTS

This invention was made with United States government support by the United States Department of Agriculture (USDA) Agriculture Research Service (ARS) under USDA Award No. 59-5302-1-145. The United States government has certain rights in the invention.

BACKGROUND

Field

The present disclosure generally relates to a technique for determining a sensible heat flux and/or performing evapotranspiration measurements for use in agriculture. More specifically, the present disclosure relates to a technique for determining a sensible heat flux using a surface-renewal technique without calibration.

Related Art

Evapotranspiration measurements offer the prospect of a significant advance in agriculture. In particular, if the amount of water vaporized from a surface (such as the ground or vegetation covering the ground) can be accurately determined, farmers can optimize the amount of water applied to their crops. This capability would allow farmers to increase crop yield, reduce costs and preserve scarce water resources.

In practice, it is difficult to accurately and economically determine the amount of water vaporized from a surface. For example, one approach to determining the amount of water vaporized from a surface is based on energy conservation. In particular, energy balance dictates that residual heat flux that vaporizes water is given by the net electromagnetic radiation incident on the surface minus the sum of the heat flux conveyed from the surface via air and the heat flux conducted into surface (i.e., the ground). By measuring these parameters, the residual heat flux that vaporizes water can be calculated (and, thus, the amount of water vaporized from the surface can be determined).

However, the accuracy of measurements of the heat flux conveyed from the surface via the air (which is sometimes referred to as the 'sensible heat flux'), regardless of measurement technique (e.g., eddy covariance, surface renewal, etc.), is often degraded by the size of the temperature sensors that perform these measurements. For example, a temperature at a distance above the surface may be measured using a thermocouple (and, more generally, a temperature sensor). While a very small thermocouple can provide accurate measurements, such a small temperature sensor is often fragile and, therefore, may be unreliable. To address this problem, a larger thermocouple may be used, but the thermal inertia of a larger temperature sensor can distort the temperature measurements. This distortion typically degrades the accuracy of the temperature measurements and, thus, reduces the accuracy of the determined amount of water vaporized from the surface.

Consequently, existing approaches for measuring the heat flux conveyed from the surface (and, thus, for determining the amount of water vaporized from the surface), such as eddy covariance or surface renewal, involve a calibration procedure to compensate for the thermal inertia of the sensor. During this calibration procedure, the temperature measurements can be corrected to give a more accurate estimate of the heat flux conveyed from the surface. In addition, the surface-renewal technique for measuring the heat flux usually requires calibration against other measurement techniques (such as eddy covariance). This calibration is different from the thermal inertia calibration described previously, and it is typically difficult, time-consuming and expensive. Moreover, this calibration procedure for surface-renewal measurements usually has to be performed whenever the heat flux conveyed from the surface is measured.

Hence, what is needed is a technique for determining a sensible heat flux using the surface-renewal technique and/or performing evapotranspiration measurements without the problems described above.

SUMMARY

The described embodiments include an electronic device. This electronic device includes a temperature sensor and an analysis mechanism. During operation, the temperature sensor measures temperature during a time interval at a distance from a surface. Moreover, the analysis mechanism: extracts temporal ramp signals from the measured temperature during the time interval; modifies the temporal ramp signals to compensate for first-order filtering associated with the temperature sensor; determines a heat flux conveyed from the surface to the temperature sensor via air based on the modified temporal ramp signals using a surface-renewal technique; and corrects the heat flux based on a predefined calibration value that is related to (or based on) a size of the temperature sensor.

Furthermore, the predefined calibration value may be related to (or based on) the distance. Note that the predefined calibration value may have a fixed value for a given size of the temperature sensor.

Additionally, the correction may involve a product of the heat flux and the predefined calibration value.

In some embodiments, the determining involves the average amplitude of a temperature change associated with the modified temporal ramp signals and an average spacing between the modified temporal ramp signals.

Moreover, the analysis mechanism may calculate one or more statistical moments based on the modified temporal ramp signals, and the statistical moments may include inputs in the Van Atta analysis procedure to obtain characteristics (such as amplitude and spacing) of the modified temporal ramp signals, so that the heat flux may be determined from the characteristics of the modified temporal ramp signals.

Note that the heat flux may be conveyed via convection in the air.

Furthermore, the analysis mechanism may calculate a residual heat flux that vaporizes water based on a net electromagnetic radiation incident on the surface, the corrected heat flux, and a heat flux conducted away from the surface. This may involve communication with one or more additional sensors. Therefore, in some embodiments the electronic device includes: an antenna, and an interface circuit that, during operation, communicates with a temperature sensor below the surface. During this communication, the interface circuit may receive measurements of the heat flux conducted away from the surface during the time interval. In addition, the electronic device may include an electromagnetic radiation sensor that measures the net electromagnetic radiation incident on the surface.

The analysis mechanism may perform the aforementioned operations in hardware and/or software. For example, the analysis mechanism may include: a processor, a memory and a program module (which is executed by the processor during operation) that includes instructions for: the extracting, the modifying, the determining, and/or the correcting. Alternatively or additionally, the analysis mechanism may include one or more circuits that perform at least some of these operations.

Another embodiment provides a computer-program product for use with the electronic device. This computer-program product includes instructions for at least some of the operations performed by the electronic device.

Another embodiment provides a method that includes at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

By correcting temperature measurements above a surface (such as the ground) for the first-order filtering associated with the thermal inertia of a temperature sensor (such as a thermocouple) that performed the temperature measurements, the heat flux conveyed from the surface by air can be accurately determined using the surface-renewal technique without requiring a calibration procedure against another measurement technique. Instead, a predefined calibration value may be used. This predefined calibration value may be a function of a size of the temperature sensor and/or a distance between the temperature sensor and the ground. Moreover, the predefined calibration value may have a fixed value for a given size of the temperature sensor. In addition, the measurement of the heat flux conveyed from the surface can be used to accurately determine the residual heat flux that vaporizes water from the surface. In particular, the measured heat flux conveyed from the surface may be used in conjunction with measurements of a net electromagnetic radiation incident on the surface and a heat flux conducted away from the surface (i.e., into the ground) to determine the residual heat flux without a calibration procedure.

This technique for determining the heat flux conveyed from the surface, as well as an electronic device and/or related software that implement the technique, may allow the surface-renewal measurements to be: easier to perform, cheaper and less time-consuming than existing approaches to surface-renewal measurements that involve calibration against another heat-flux measurement technique. In addition, by accurately determining the heat flux conveyed by the surface, this technique may allow farmers and owners of farm land to manage their properties more efficiently (thereby improving profit and reducing farming costs) and in a more socially responsible manner (e.g., increasing crop yields and reducing water consumption).

Figure 1:
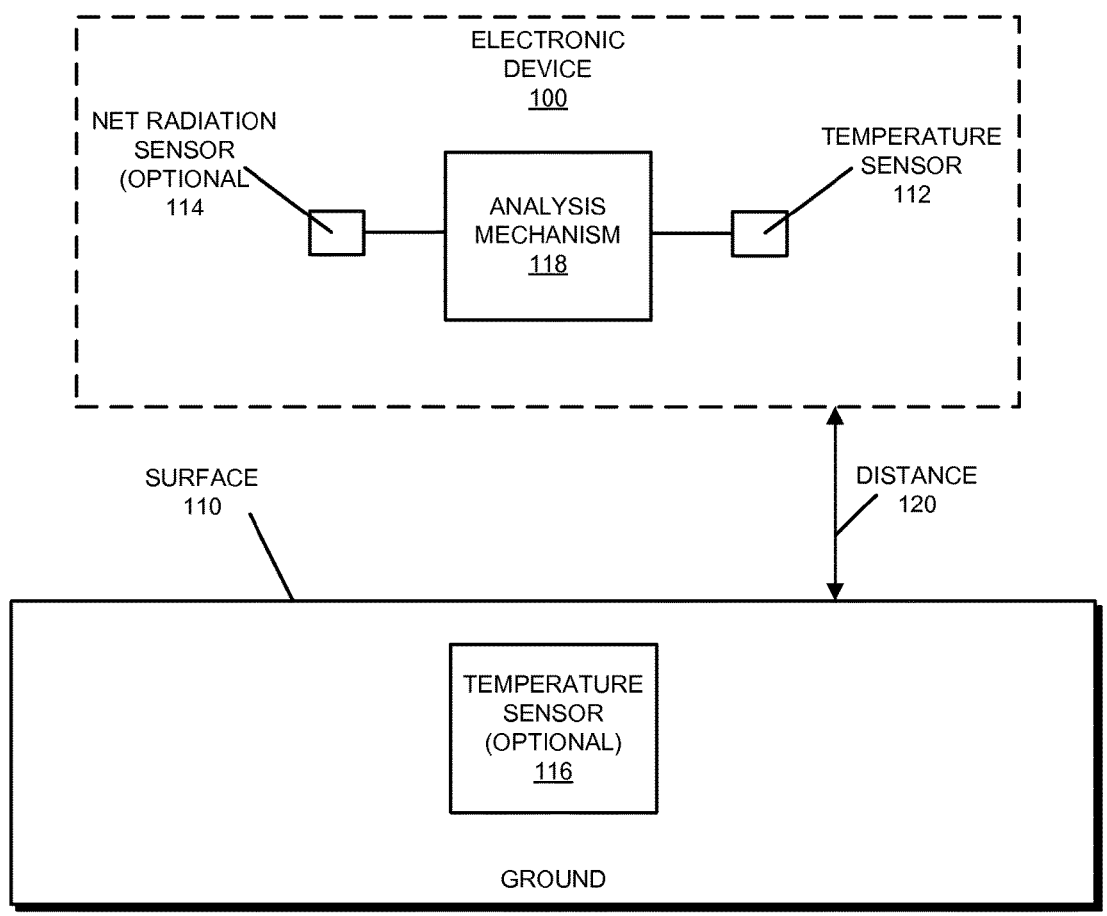
FIG. 1 is a block diagram illustrating an electronic device performing measurements above a surface in accordance with an embodiment of the present disclosure.

We now describe embodiments of the electronic device. FIG. 1 presents a block diagram illustrating an electronic device 100 performing measurements above a surface 110. This electronic device may include, may be coupled to and/or may communicate with one or more sensors that, during operation of electronic device 100, perform measurements that can be used to determine the heat flux conveyed from surface 110 to electronic device 100 via the air (such as the sensible heat flux conveyed by convection and/or turbulent airflow) and/or the residual heat flux that evaporates or vaporizes water from surface 110. Thus, electronic device 100 may be used to perform evapotranspiration measurements. Consequently, while surface 110 may be associated with a variety of objects, in the discussion that follows surface 110 is associated with vegetation growing above the ground or bare ground (e.g., the surface of the Earth).

In particular, electronic device 100 may include: a temperature sensor 112 and an optional net radiation sensor 114, and may communicate (e.g., via wired or wireless communication) with an optional temperature sensor 116 below surface 110 (i.e., which is embedded in an object having surface 110). For example, temperature sensor 112 and/or optional temperature sensor 116 may include one or more of: a resistor, a diode, a thermocouple, a thermopile, a thermistor, an infrared sensor, a thermometer (such as a mercury thermometer), a sonic anemometer and, more generally, a device that determines temperature based on a physical phenomenon that is a function of temperature (such as thermal expansion, resistance, a voltage across a semiconductor junction, etc.). In addition, optional net radiation sensor 114 may include one or more of: a net radiometer, an actinometer, a solar radiation sensor and, more generally, a device that measures the difference between downward/incoming radiation and upward/outgoing radiation from the surface of the Earth.

Furthermore, electronic device 100 may include an analysis mechanism 118 that analyzes sensor data provided by the one or more sensors. During operation of electronic device 100, temperature sensor 112 may measure the temperature during a time (such as 30 minutes) interval at a distance 120 above surface 110 (such as 0.5 m for the surface of the Earth or soil, or near the top of a plant growing in soil). Then, analysis mechanism 118 may analyze the temperature data to determine the heat flux conveyed from surface 110 to electronic device 100 via the air. In particular, as described further below with reference to FIGS. 3 and 4, analysis mechanism 118 may: extract temporal ramp signals from the measured temperature during the time interval; modify the temporal ramp signals to compensate for first-order filtering associated with temperature sensor 112; determine the heat flux conveyed from surface 110 to temperature sensor 112 via air based on the modified temporal ramp signals; and correct the heat flux based on a predefined calibration value that is related to (or based on) a size of temperature sensor 112 and/or distance 120. For example, the heat flux may be corrected by taking the product of the heat flux with the predefined calibration value. Note that the predefined calibration value may have a fixed value for a given size of temperature sensor 112.

In an exemplary embodiment, the predefined calibration value is approximately 0.5 for a temperature sensor having a size (such as a diameter) of tens of microns or more. Alternatively, in some embodiments the predefined calibration value is 0.4 for a temperature sensor having a size of tens of microns or more.

In some embodiments, the determining involves (or is based on) an average amplitude of a temperature change associated with the modified temporal ramp signals and an average spacing between the modified temporal ramp signals. Moreover, analysis mechanism 118 may calculate: one or more statistical moments based on the modified temporal ramp signals (such as the second, third and/or fifth-order structure function), an average amplitude and spacing of the modified temporal ramp signals based on the structure-function statistics, and the heat flux conveyed from surface 110 to temperature sensor 112 via the air based on an average amplitude and spacing of the temporal ramp signals. For example, the modified temporal ramp signals may be analyzed using a structure function.

Furthermore, analysis mechanism 118 may calculate a residual heat flux that vaporizes water based on a net electromagnetic radiation incident on surface 110, the corrected heat flux, and a heat flux conducted away from surface 110 (e.g., into the ground). In particular, during operation of electronic device 100, an optional net radiation sensor 114 may measure the net electromagnetic radiation incident on surface 110 (which is the difference of the downward/incoming radiation and the upward/outgoing radiation from surface 110) and optional temperature sensor 116 may measure heat flux conducted away from surface 110. Then, based on the energy balance equation $$R_N = S + G + LE,$$

where $R_N$ is the net electromagnetic radiation incident on surface 110, S is the heat flux conveyed from surface 110 to the temperature sensor (i.e., the sensible heat flux), G is the heat flux conducted away from surface 110, and LE is the residual heat flux. Rearranging, the residual heat flux is given by $$LE = R_N - S - G.$$

Figure 5:
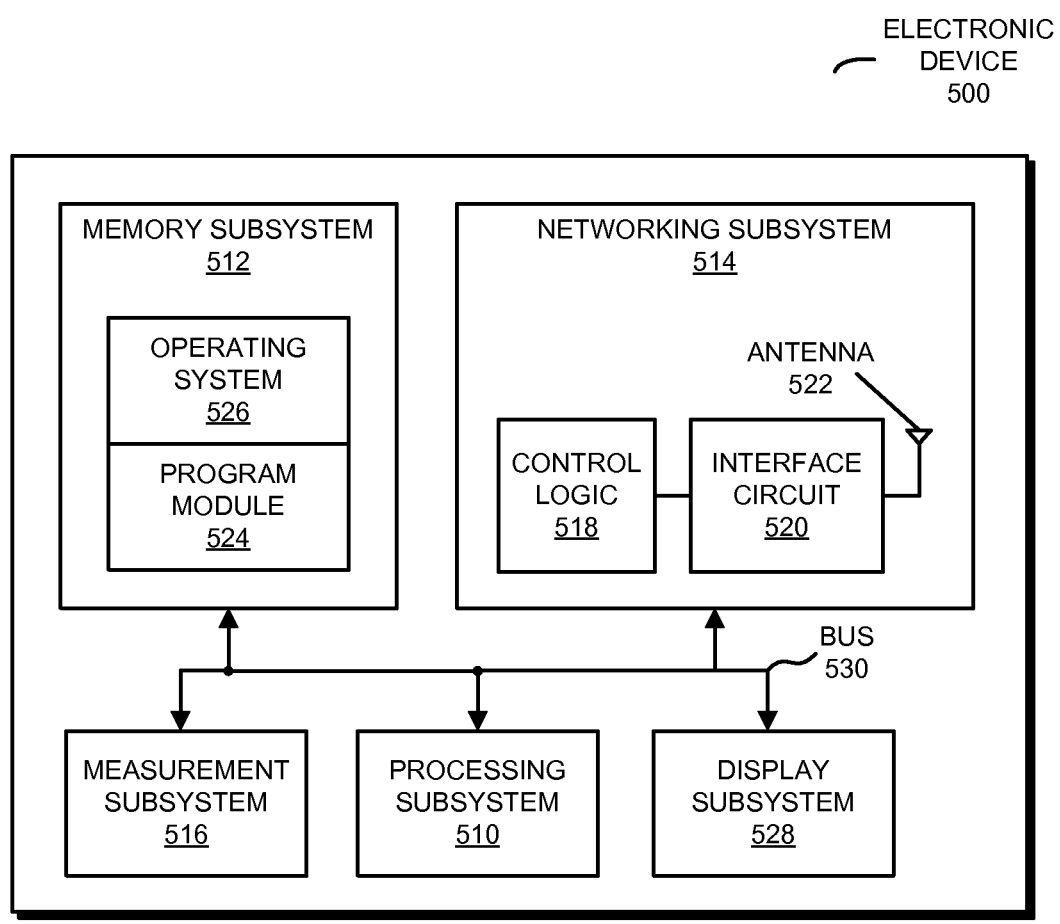
FIG. 5 is a block diagram illustrating an electronic device in accordance with an embodiment of the present disclosure.

As described further below with reference to FIG. 5, note that the communication between electronic device 100 and optional temperature sensor 116 may involve wired or wireless communication. Therefore, in some embodiments electronic device 100 includes: control logic 518 (FIG. 5), interface circuit 520 (FIG. 5) and/or an antenna 522 (FIG. 5) that communicates with optional temperature sensor 116, which is below surface 110 (such as a quarter-sized temperature sensor 5 cm below surface 110). During this communication, interface circuit 520 (FIG. 5) may receive measurements of temperature, which analysis mechanism 118 may use to compute the heat flux conducted away from surface 110 during the time interval.

In this way, electronic device 100 may determine the sensible heat flux and/or the residual heat flux more accurately, more easily, with less cost, and/or in less time. In particular, electronic device 100 may determine the sensible heat flux and/or the residual heat flux without requiring a calibration procedure to correct the heat flux conveyed from surface 110 to temperature sensor 112 via the air. Note that the evapotranspiration measurements performed by electronic device 100 may be used to characterize an area, such as 1-5 acres of land.

Figure 2:
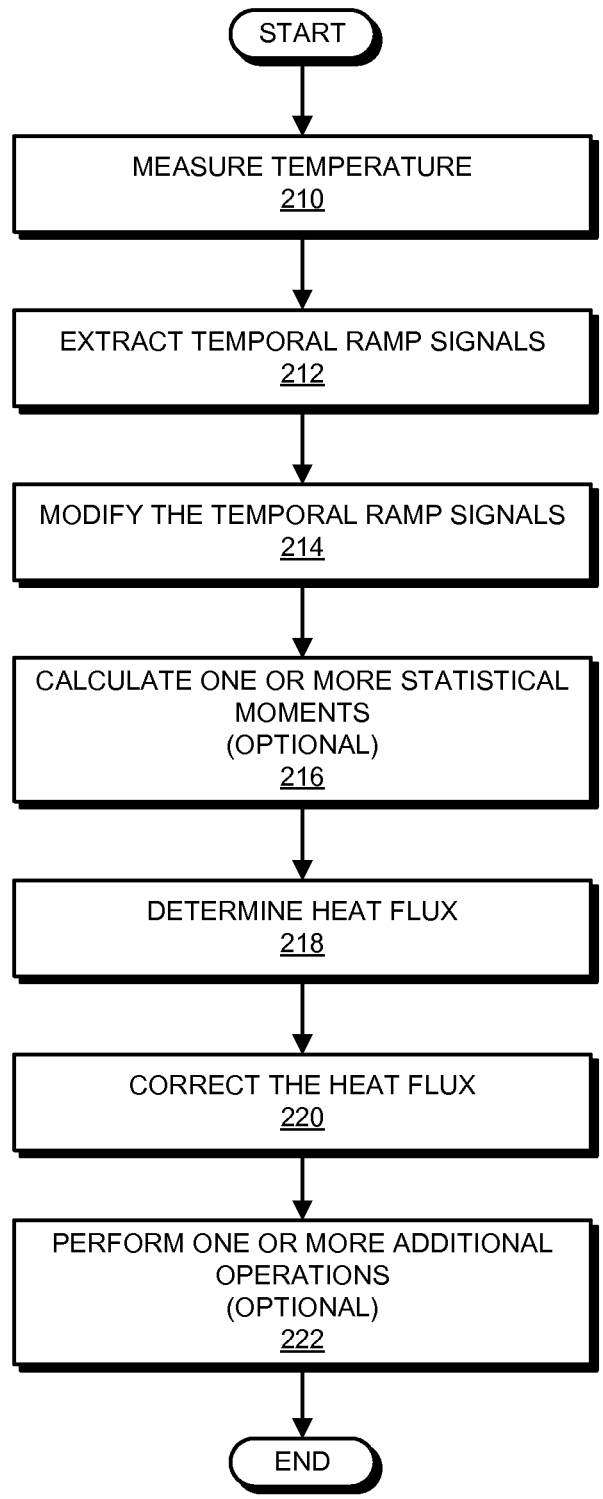
FIG. 2 is a flow diagram illustrating a method for determining a heat flux from the surface of FIG. 1 in accordance with an embodiment of the present disclosure.

FIG. 2 presents a flow diagram illustrating a method 200 for determining a heat flux from surface 100 (FIG. 1), which may be performed by electronic device 100 (FIG. 1). During operation, the electronic device measures temperature (operation 210) during a time interval at a distance from a surface. For example, a thermocouple (and, more generally, a temperature sensor) may measure the temperature as a function of time (such as time samples every 0.1 s) 0.5 m above the ground. Note that the sampling frequency may be a function of the distance (and may increase as the distance is decreased).

Figure 3:
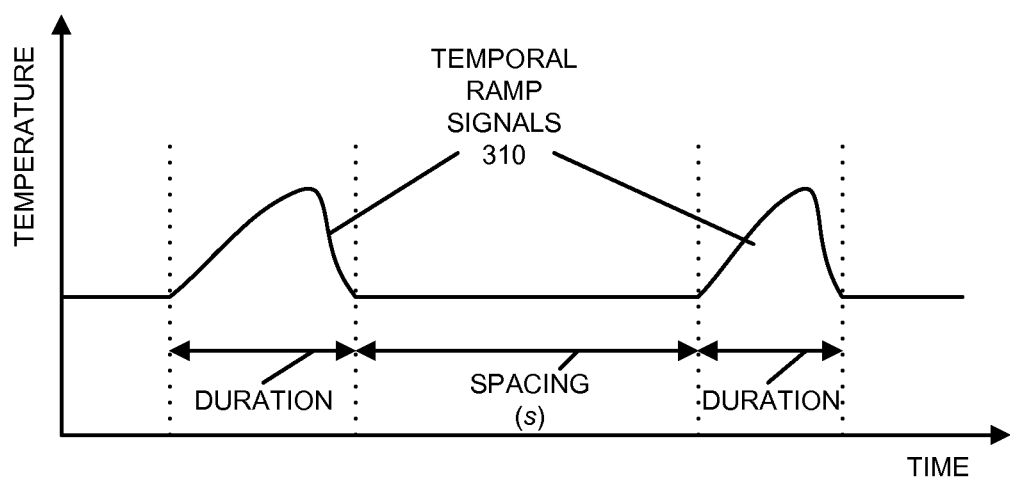
FIG. 3 is a drawing illustrating measurements of temperature above the surface of FIG. 1 in accordance with an embodiment of the present disclosure.

Then, the electronic device extracts temporal ramp signals (operation 212) from the measured temperature during the time interval. In particular, the temperature measurements may include a noisy, random temporal component with interspaced repeating ramp-like increases in temperature followed by discontinuous drops in temperature (the latter is shown in FIG. 3). In this discussion, these 'ramps' are referred to as 'temporal ramp signals'. These temporal ramp signals are associated with turbulent eddies in the air that carry or convey heat from the surface to a temperature sensor in the electronic device. Thus, the temporal ramp signals represent the signal and the random temporal component represents the noise in this evapotranspiration measurement. In addition, note that extracting the temporal ramp signals may involve a time-series calculation that includes a statistical analysis of the probability of when the temporal ramp signals occur (and, thus, which may determine the average spacing between adjacent temporal ramp signals).

However, the size of the temperature sensor affects the measured temporal ramp signals. In principle, a very small (micron-sized) temperature sensor (which has less thermal mass or inertia) can accurately measure the temperature. Such a temperature sensor may be fragile, and thus may present reliability problems in the field. These challenges may be overcome by using a larger (tens of micron-sized) temperature sensor. The larger thermal mass, however, filters the temperature measurements. This filtering decreases the size of the temperature change and reduces the slope of the temporal ramp signals. In the extreme case of a very large temperature sensor, the temperature change and the slope are reduced to zero.

Consequently, the electronic device modifies the temporal ramp signals (operation 214) to compensate for first-order filtering associated with the temperature sensor (and the damping associated with the thermal time constant of the temperature sensor). For example, the compensation may be performed in the frequency domain (such as by using dividing by a transfer function associated with the temperature sensor) and/or in the time domain (such as by performing a point-to-point de-convolution of the impulse response associated with the temperature sensor).

In some embodiments, the electronic device optionally calculates one or more statistical moments (operation 216), and more generally structure-function values, based on the modified temporal ramp signals, an average amplitude and spacing of the temporal ramp signals (which may be determined using the Van Atta procedure with the structure-function values as inputs into the Van Atta procedure), and (as described below) the heat flux is determined using the surface-renewal technique. For example, a structure function may be used to perform a statistical average of the modified temporal ramp signals acquired over a time interval of 30 minutes. This structure function may determine the second, third and fifth moments of the average modified temporal ramp signals. These statistical moments may include information about the duration of the modified temporal ramp signals and the temperature change during the modified temporal ramp signals. In conjunction with the average spacing, this information may be used to calculate the heat flux conveyed from the surface to the electronic device (and, in particular, to the temperature sensor) via the air using the surface-renewal technique.

Next, the electronic device determines the heat flux (operation 218) conveyed from the surface to the temperature sensor via the air based on the modified temporal ramp signals as inputs in the surface-renewal technique. As noted previously and described further below, this calculation may be a function of the temperature change during the modified temporal ramp signals, the duration of the modified temporal ramp signals and the spacing between the modified temporal ramp signals.

Furthermore, the electronic device corrects the heat flux (operation 220) based on a predefined calibration value that is related to a size of the temperature sensor and/or the distance from the surface. Instead of performing a calibration procedure for surface-renewal measurements using measurements from another technique (such as the eddy covariance flux measurement technique), the predefined or predetermined calibration value may be used. For example, the heat flux may be multiplied by the predefined calibration value. In an exemplary embodiment, the predefined calibration value is 0.4. Note that the predefined calibration value may be the same for different temperature sensors and/or measurement geometries (such as that shown in FIG. 1). Thus, in some embodiments, the predefined calibration value is a function of the size of the temperature sensor.

In some embodiments, the electronic device optionally performs one or more additional operations (operation 222). For example, the electronic device may receive, from a temperature sensor below the surface, measurements of the heat flux conducted away from the surface during the time interval. Alternatively or additionally, the electronic device may receive, from an electromagnetic radiation sensor, measurements of the net electromagnetic radiation incident on the surface. Then, as described previously, the electronic device may calculate a residual heat flux that vaporizes water based on a net electromagnetic radiation incident on the surface, the corrected heat flux, and a heat flux conducted away from the surface.

In some embodiments of method 200, there are additional or fewer operations. Moreover, the order of the operations may be changed, and/or two or more operations may be combined into a single operation. For example, calculating the one or more statistical moments (operation 216) may be performed before modifying the temporal ramp signals (operation 214).

FIG. 3 presents a drawing illustrating measurements of temperature above surface 110 (FIG. 1). In particular, the temperature measurements include temporal ramp signals 310, which are associated with turbulent eddies that carry or convey heat from the surface to the electronic device via the air. In addition, the temperature measurements include a noisy, random component 312 superimposed onto the temporal ramp signal. For purposes of simplicity and ease of viewing, the noisy, random component is not shown in FIG. 3.

Figure 4:
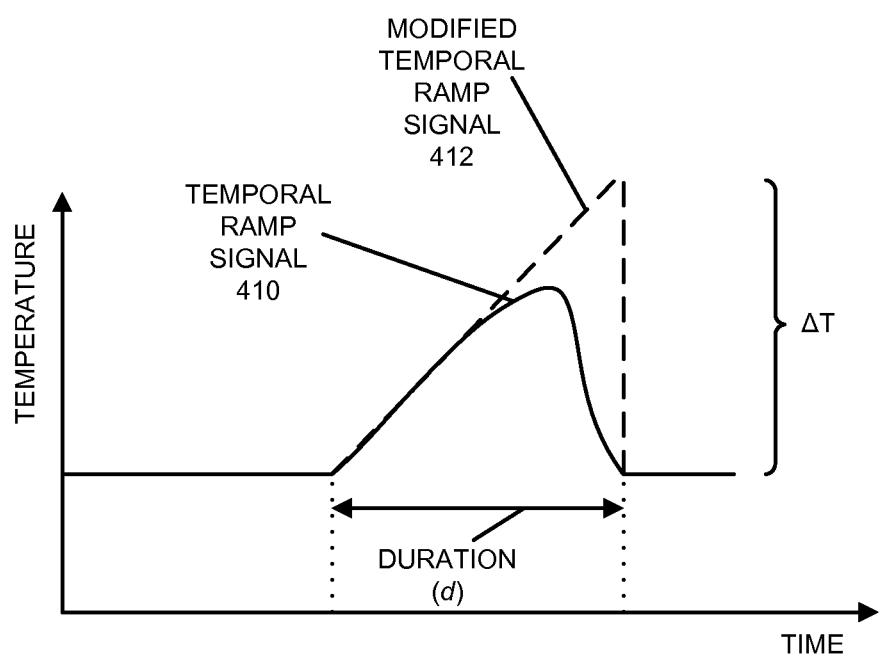
FIG. 4 is a drawing illustrating a temporal ramp signal extracted from the measurements shown in FIG. 3 in accordance with an embodiment of the present disclosure.

FIG. 4 presents a drawing illustrating a temporal ramp signal 410 extracted from the measurements shown in FIG. 3. The filtering associated with the size of the temperature sensor may cause distortion and damping of temporal ramp signal 410. After correction for this first-order filtering, a modified temporal ramp signal 412 may be obtained. Using this modified temporal ramp signal, parameters used to calculate the heat flux conveyed from the surface via the air using the surface-renewal technique may be determined. These parameters may include the temperature change ($\Delta T$) during the modified temporal ramp signals, the duration (d) of the modified temporal ramp signals and the spacing (s) between the modified temporal ramp signals.

In an exemplary embodiment, the heat flux conveyed from the surface via the air in the surface-renewal technique is given by $$\alpha \cdot \rho \cdot C \cdot h_c \cdot \frac{dT}{dt} \approx \alpha \cdot \rho \cdot C \cdot h_c \cdot \frac{\partial T}{\partial t} = \alpha \cdot \rho \cdot C \cdot h_c \cdot \frac{\Delta T}{d},$$

where $\alpha$ is the predefined calibration value, $\rho \cdot C$ is the specific heat per unit volume, and $h_c$ is the distance between the temperature sensor and the surface (i.e., the height above the surface). Thus, the heat flux conveyed from the surface via the air is given by $$A_r \cdot \frac{d}{d+s},$$

where $A_r$ has the dimensions of heat flux.

We now describe embodiments of the electronic device. FIG. 5 presents a block diagram illustrating an electronic device 500, such as electronic device 100 in FIG. 1. This electronic device includes processing subsystem 510, memory subsystem 512, networking subsystem 514 and measurement subsystem 516 (with one or more sensors, such as a temperature sensor and/or a net radiation sensor). Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 524 or operating system 526), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 518, an interface circuit 520 and an antenna 522. For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system. In general, networking subsystem 514 may be compatible with a wide variety of communication protocols and techniques.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices. For example, networking subsystem 514 may include at least one radio. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 includes a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, monitoring or calculating a performance metric associated with the communication, adapting the communication based one the performance metric, etc.)

Within electronic device 500, processing subsystem 510, memory subsystem 512, networking subsystem 514 and measurement subsystem 516 are coupled together using bus 530. Bus 530 may include an electrical, optical, and/or electro-optical connection that the subsystems can use to communicate commands and data among one another. Although only one bus 530 is shown for clarity, different embodiments can include a different number or configuration of electrical, optical, and/or electro-optical connections among the subsystems.

In some embodiments, electronic device 500 includes a display subsystem 528 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a tablet computer, a smartphone, a cellular telephone, an electronic device (such as an evapotranspiration measurement system), a portable computing device, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, measurement subsystems and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments, some or all of a given subsystem or component can be integrated into one or more of the other subsystems or component(s) in electronic device 500. For example, in some embodiments program module 524 is included in operating system 526.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Therefore, calculations performed during the heat-flux density technique may be performed in the analog and/or the digital domain, as well as in the time domain and/or the frequency domain. Additionally, components and circuits may be single-ended or differential, and power supplies may be unipolar or bipolar.

An integrated circuit may implement some or all of the functionality of electronic device 500. Moreover, the integrated circuit may include hardware and/or software mechanisms that are used for analyzing measurements to determine the sensible heat flux, the residual heat flux and/or at least a portion of an evapotranspiration measurement.

While some of the operations in the preceding embodiments were implemented in hardware or software, in general the operations in the preceding embodiments can be implemented in a wide variety of configurations and architectures.

Therefore, some or all of the operations in the preceding embodiments may be performed in hardware, in software or both. For example, at least some of the operations performed by the analysis mechanism (such as processing subsystem 510) may be implemented using program module 524, operating system 526 (such as a driver for interface circuit 520) or in firmware in interface circuit 520. Alternatively or additionally, at least some of the operations in the heat-flux-density technique may be implemented in hardware, such as one or more circuits in an integrated circuit or in a physical layer, such as hardware in interface circuit 520.

Moreover, while the preceding embodiments illustrated the use of electronic device 500 to perform the heat-flux-density technique, in some embodiments at least a portion of the heat-flux-density technique is performed by a remote electronic device or server.

The preceding embodiments may include fewer components or additional components. Although these embodiments are illustrated as having a number of discrete items, these embodiments are intended to be functional descriptions of the various features that may be present rather than structural schematics of the embodiments described herein. Consequently, in these embodiments two or more components may be combined into a single component, and/or a position of one or more components may be changed.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
    a temperature sensor configured to measure a temperature during a time interval at a distance from a surface, wherein the measured temperature can be used to determine a heat flux conveyed from the surface; and
    an analysis mechanism, coupled to the temperature sensor, configured to:
    extract temporal ramp signals from the measured temperature during the time interval;
    modify the temporal ramp signals to compensate for first-order filtering associated with the temperature sensor;
    determine a heat flux conveyed from the surface to the temperature sensor via air based on the modified temporal ramp signals using a surface-renewal technique; and
    correct the heat flux based on a predefined calibration value that is related to a size of the temperature sensor.

2. The electronic device of claim 1, wherein the predefined calibration value is further related to the distance.

3. The electronic device of claim 1, wherein the predefined calibration value has a fixed value for a given size of the temperature sensor.

4. The electronic device of claim 1, wherein the correction involves a product of the heat flux and the predefined calibration value.

5. The electronic device of claim 1, wherein the determining involves an average amplitude of a temperature change associated with the modified temporal ramp signals and an average spacing between the modified temporal ramp signals.

6. The electronic device of claim 1, wherein the analysis mechanism comprises:
    a processor;
    a memory coupled to the processor;
        a program module stored in the memory and configured to be executed by the processor to determine the heat flux, the program module including:
        instructions for the extracting;
        instructions for the modifying;
        instructions for the determining; and
        instructions for the correcting.

7. The electronic device of claim 1, wherein the analysis mechanism is further configured to calculate one or more statistical moments based on the modified temporal ramp signals; and
    wherein the heat flux is determined using the one or more statistical moments.

8. The electronic device of claim 1, wherein the heat flux is conveyed via convection in the air.

9. The electronic device of claim 1, wherein the analysis mechanism is further configured to calculate a residual heat flux that vaporizes water based on a net electromagnetic radiation incident on the surface, the corrected heat flux, and a heat flux conducted away from the surface.

10. The electronic device of claim 9, wherein the electronic device further comprises:
    an antenna; and
    an interface circuit, coupled to the antenna, configured to communicate with a temperature sensor below the surface, wherein the interface circuit is further configured to:
    receive measurements of the heat flux conducted away from the surface during the time interval.

11. The electronic device of claim 9, wherein the electronic device further comprises an electromagnetic radiation sensor, coupled to the analysis mechanism, configured to measure the net electromagnetic radiation incident on the surface.

12. A computer-program product for use in conjunction with an electronic device, the computer-program product comprising a non-transitory computer-readable storage medium and a computer-program mechanism embedded therein to determine a heat flux, the computer-program mechanism including:
    instructions for extracting temporal ramp signals from a temperature measured at a distance from a surface during a time interval, wherein the measured temperature is obtained from a temperature sensor and can be used to determine a heat flux conveyed from the surface;
    instructions for modifying the temporal ramp signals to compensate for first-order filtering associated with the temperature sensor;

instructions for determining the heat flux conveyed from the surface to the temperature sensor via air based on the modified temporal ramp signals using a surface-renewal technique; and instructions for correcting the heat flux based on a predefined calibration value that is related to a size of the temperature sensor.

13. The computer-program product of claim 12, wherein the predefined calibration value is further related to the distance.

14. An electronic-device-implemented method for determining a heat flux, wherein the method comprises:

using a temperature sensor to measure a temperature during a time interval at a distance from a surface, wherein the measured temperature can be used to determine a heat flux conveyed from the surface; and using the electronic device, extracting temporal ramp signals from the measured temperature during the time interval;

modifying the temporal ramp signals to compensate for first-order filtering associated with the temperature sensor;

determining the heat flux conveyed from the surface to the temperature sensor via air based on the modified temporal ramp signals using a surface-renewal technique; and correcting the heat flux based on a predefined calibration value that is related to a size of the temperature sensor.

15. The method of claim 14, wherein the predefined calibration value is further related to the distance.

16. The method of claim 14, wherein the determining involves an average amplitude of a temperature change associated with the modified temporal ramp signals and an average spacing between the modified temporal ramp signals.

17. The method of claim 14, wherein the method further comprises calculating one or more statistical moments based on the modified temporal ramp signals; and wherein the heat flux is determined using the one or more statistical moments.

18. The method of claim 14, wherein the method further comprises calculating a residual heat flux that vaporizes water based on a net electromagnetic radiation incident on the surface, the corrected heat flux, and a heat flux conducted away from the surface.

19. The method of claim 18, wherein the method further comprises receiving, from a temperature sensor below the surface, measurements of the heat flux conducted away from the surface during the time interval.

20. The method of claim 18, wherein the method further comprises receiving, from an electromagnetic radiation sensor, measurements of the net electromagnetic radiation incident on the surface.

* * * * *